United States Patent

[11] 3,564,274

| [72] | Inventor | Kenneth L. Kaltz |
| | | Lansing, Mich. |
| [21] | Appl. No. | 780,975 |
| [22] | Filed | Dec. 4, 1968 |
| [45] | Patented | Feb. 16, 1971 |
| [73] | Assignee | Tranter Manufacturing, Inc. |
| | | Lansing, Mich. |

[54] ELECTRICAL CIRCUITRY FOR VEHICULAR REFRIGERATING SYSTEMS
17 Claims, 2 Drawing Figs.

[52] U.S. Cl. .................................................. 307/10, 62/236
[51] Int. Cl. ..................................................... H02g 3/00
[50] Field of Search ......................................... 307/10, 66, 80, 85; 62/236

[56] References Cited
UNITED STATES PATENTS

| 2,937,510 | 5/1960 | Allyne | 62/236X |
| 2,972,057 | 2/1961 | Boehmer et al | 307/10 |
| 3,315,474 | 4/1967 | Farer | 62/236X |
| 3,431,428 | 3/1969 | VanValer | 307/10 |

Primary Examiner—David Smith, Jr.
Assistant Examiner—H. J. Hohauser
Attorney—Whittemore, Hulbert & Belknap ABSTRACT: The electrical components and wiring are permanently installed in a truck refrigeration system, in which direct current powered fans circulate air past eutectic-filled heat transfer plates during both a layover, temperature pulldown phase and an over-the-road phase. In transit the fans are energized from the vehicle's 12 volt battery, and from a conventional 220 volt AC line during layover. The latter voltage is stepped down and rectified to direct current at the fan motor rating. A relay is part of a battery-supplied holding circuit including dashboard, door and thermostatic switches to establish a holding circuit; and both of the battery and rectified circuits include the closed armature of the relay.

PATENTED FEB 16 1971

INVENTOR
KENNETH L. KALTZ

BY Whittemore, Hulbert & Belknap

ATTORNEYS 3,564,274

ELECTRICAL CIRCUITRY FOR VEHICULAR REFRIGERATING SYSTEMS

Background of the Invention

1. Field of the Invention

As indicated in the Abstract, the invention finds primary application in the operation of motor powered components of a refrigerated automotive vehicle, for example, in a an installation such as the Model "Cold 45" system manufactured by Hackney Bros. Body Co. of Wilson, North Carolina, although other vehicular installations are contemplated. Indeed, the circuitry is well adapted to various types of application in which it is desirable, using direct current-energized fan means, or other electrically motorized units, to attain identical operation of these units whether powered from an alternating current line, as appropriately stepped down and rectified to direct current, or from a standard battery rated to the requirements of the motorized units.

2. Description of the Prior Art

The most pertinent patent of which I am aware is Boehmer et al. No. 2,972,057 of Feb. 14, 1961, however the conversion unit shown and described in this reference utilizes as a prime mover for illustrated air-circulating fan means a special though conventional motor of a combined AC-DC type. The Boehmer et al. system thus involves quite complicated circuitry and multiple relay means, in addition to transformer means, for the operation of the fan, as from an AC source in a layover period and a battery source in over-the-road operation.

SUMMARY OF THE INVENTION

The invention affords circuitry for the energization of standard, relatively inexpensive and widely available direct current fans of 12-volt rating by either an alternating current source of usual line voltage and amperage, or a standard 12-volt rechargeable storage battery; whence it follows that the components and electrical wiring of the improved system are less expensive and simpler of installation, indeed, than the type of circuitry which is presently being used for a like purpose. Also included in the system of the invention are door, dashboard and thermostatic switch means of a known type, plus relatively simple and inexpensive transformer and diode-type blocking and rectifier means of an inexpensive sort. These arrangements are extremely well adapted to an installation in which a number of eutectic solution-filled refrigerated plates are dropped in temperature in a layover phase, as through the agency of a known type of compressor-condenser-evaporator refrigerating system, then cool the vehicle contents, as desired, in either or both operational phases.

DESCRIPTION OF PREFERRED EMBODIMENTS

Figure 1:
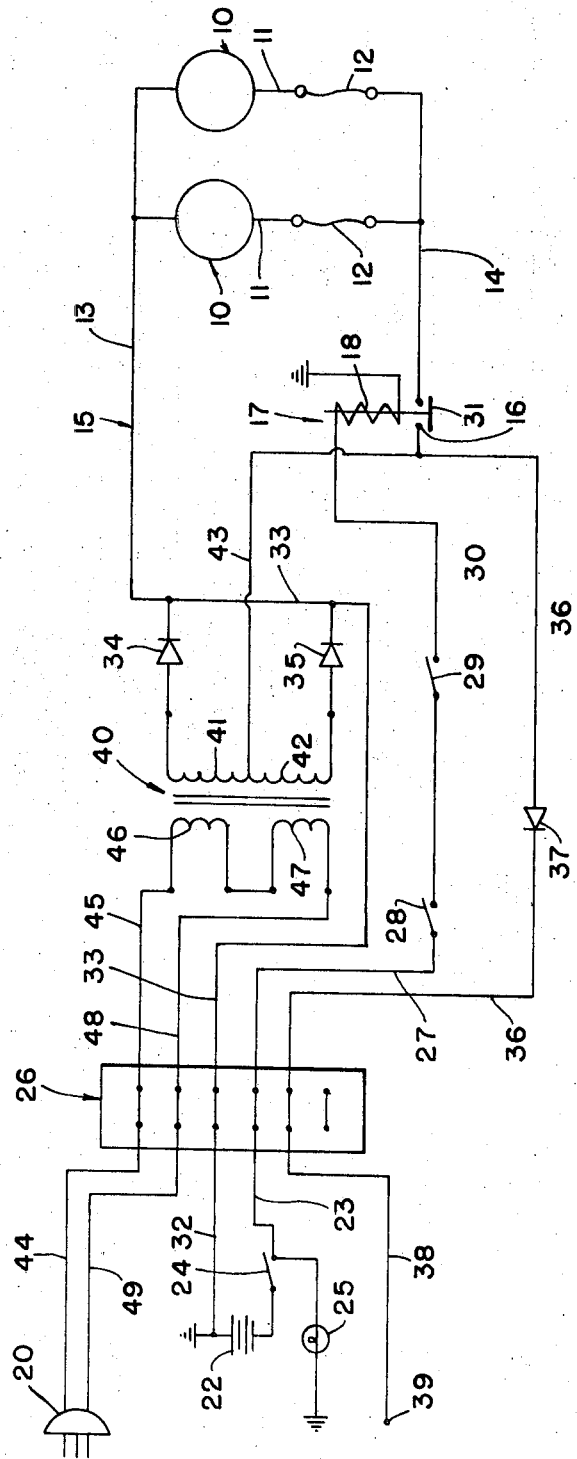
FIG. 1 is a schematic wiring diagram of the improved AC-DC fan powering circuitry of the invention, in a positive-grounded version of the wiring.

In the embodiment of the improved system illustrated in FIG. 1, the air circulating fans 10 are, as indicated above, driven by 12-volt DC motors, being connected in parallel, as through leads 11 and fuses 12 of appropriate rating between further leads 13 and 14. All of these components are parts of a subcircuit which is generally designated by the reference numeral 15 and is controlled at contacts 16 of a grounded relay 17, the coil of which is designated 18.

As indicated above, alternating current voltage is fed into a part of the circuitry of the figure, as through a conventional plug connector 20, from a standard 220-volt AC line (not shown). On the other hand, 12-volt direct current is supplied from the usual 12 volt grounded battery 22 of the truck.

The circuit of battery 22 includes a lead 23 from its positive terminal through the usual dashboard switch 24 of the vehicle, with a grounded pilot lamp 25 being connected in parallel with lead 23, and the latter being wired to a jack of a terminal board 26. A further lead 27 is electrically connected to lead 23 at board 26, the lead 27 having connected in series therein a normally open door-controlled switch 28 and a conventional thermostatic switch 29. Another lead 30 goes from a terminal of thermostat 29 to the coil 18 of relay 17, which is grounded. Thus, upon the closure of dash switch 24, door switch 28 and thermostatic switch 29 the latter signaling a need for fan motor operation, a circuit is completed to energize relay 17 and close its conductive armature 31 across its contacts 16. This establishes a direct current holding circuit through the fans or motors 10.

Direct current for fan units 10 is supplied through a subcircuit which includes a battery terminal lead 32 connected to a jack of terminal board 26, another lead 33 being being electrically connected to lead 32 at the board. Lead 33 is electrically connected to the lead 13 of motor subcircuit 15 at the downstream side of a pair of diodes 34, 35 which afford full wave rectification from AC to DC of the voltage originating at the 220-volt line, as later described.

Thus, battery current flows through leads 32, 33 and 13, fans 10, parallel leads 11, fuses 12, lead 14 and the closed relay armature 31, thence to another lead 36 which is connected to one of the relay contacts 16 and has a blocking diode 37 wired therein. Lead 36 connects to a tap of terminal board 26, thence through another tap of the board and a lead 38 to a terminal 39, which happens to be a generator terminal of a voltage regulator (not shown). In well known manner the regulator connects electrically to the second terminal of battery 22, i.e., on the positive side of dash switch 24. In this manner a direct current energization of motors 10 is completed for on-the-road operation. The motors being deenergized upon the opening of thermostatic switch 29 at a predetermined lowered temperature, which opening causes holding relay 17 to drop out. There is therefore no further drain on the battery-generator until switch 29 recloses, and of course at that time only if the dashboard switch 24 and the door switch 28 are both closed also.

The reference numeral 40 generally designates a center tap transformer whose secondary windings 41, 42 are electrically connected at opposite ends to the respective rectifier diodes 34, 35, the center tap of the secondaries being connected by a lead 43 with a contact 16 of relay 17, the diode 37 blocking flow in DC lead 36. The 220-volt AC potential reaches transformer 40 through a connector plug lead 44 connected to a jack of terminal board 26, and through that board with a lead 45 to the primary windings 46, 47 of the transformer. A further lead 48 goes to a jack on board 26 and a final lead 49 to the AC voltage plug 20.

Accordingly, assuming the continued closure of dash, door and thermostatic switches 24, 28 and 29, respectively, to energize relay 17 and close its armature 31, the AC supply, as dropped by transformer 40 to a value of 12-volts, flows in a circuit which includes, as polarity reverses, a transformer secondary winding 41, and a rectifying diode 34 (or the secondary winding 42 and the other diode 35), the lead 13 of motor subcircuit 15, motors 10, leads 11, fuses 12, lead 14 and relay armature 31, thence through lead 43 back to the center tap of the transformer 40.

Figure 2:
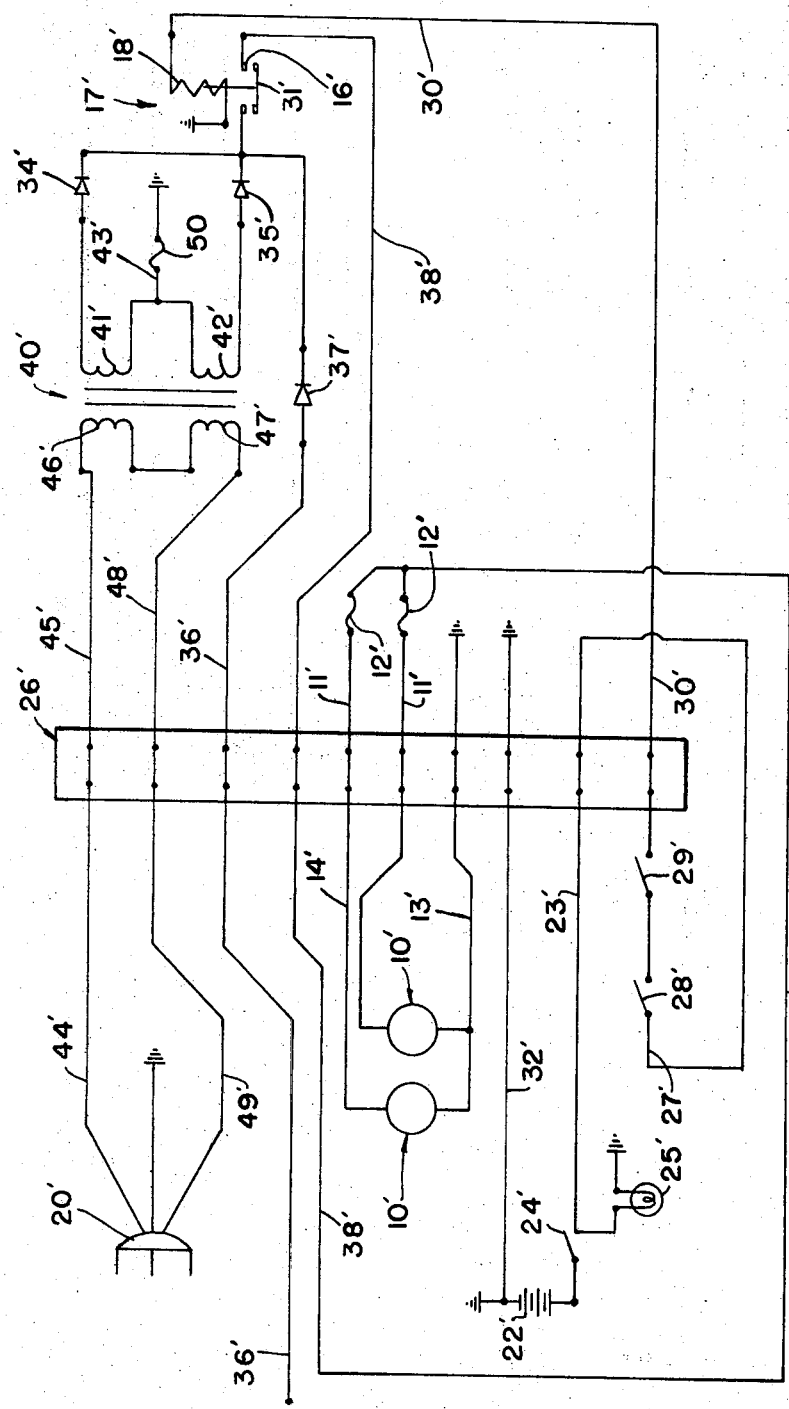
FIG. 2 is an alternative version in which negative-grounded components are employed.

The above described version of the fan energizing circuitry is one in which the battery 22 is seen to be grounded at its positive terminal. FIG. 2 illustrates an alternative or variation in which the DC source is grounded a bit more conventionally at its negative terminal. In all operational aspects, however, the arrangements of FIGS. 1 and 2 are comparable; accordingly, components and relationships appearing in FIG. 2 which correspond with those of FIG. 1 are designated by corresponding reference numerals, primed, and further direction is dispensed with in the interest of simplicity.

Parallel-connected fan motors 10' and fuses 12' are electrically energized between grounded motor terminals in a rectified alternating current supply circuit flowing through transformer 40', which circuit includes a fuse 50 between transformer secondaries 41', 42' and ground, a diode 34' or 35', relay armature 31', lead 38', fuses 12', and lead 13' to ground. The additional blocking diode 37' is interposed in the lead 36' from the transformer circuit to the accessory panel of the ignition switch to block flow of rectified AC voltage to the latter.

The direct current fan energizing circuit flows from battery 22' through components and wiring including the lead 36', diode 37' armature 31' of relay 17', lead 38', fuses 12' and fans 10' to ground.

The relay energizing circuit, as in the earlier form, includes the switches 24', 28' and 29', lead 30' and grounded relay coil 18', thereby completing the circuitry described above for conducting both the operating direct current and rectified alternating current voltages. In the case of the latter, there is a drain on the battery source only so long as thermostatic switch 29' remains closed (also switches 24 and 28) to energize only the coil 18' of relay 17'.

Thus, the invention affords electrical wiring transformer and rectifier components, as controlled by only a single relay in a dashboard, door and thermostatic switch holding circuit, to furnish a steady 12-volt supply of current for the energization of fan motors 10 in a constant voltage and current value, whether the motors are being operated in over-the-road service or lay over, temperature pulldown service.

I claim:

1. In an electrical circuit of the type described, separate sources of alternating current and direct current voltage, and an electrical device energizable effectively only by direct current, a relay electrically connected between said device and said direct current source and energized by the latter to complete a holding subcircuit for the device from said source, as well as a direct current energizing circuit through said device, and rectifying means electrically connected in a circuit also including said relay between said alternating current source and said device to energize the latter under a steady current from the alternating current source, as an alternative to energization from the direct current source.

2. The circuit of claim 1, and further comprising transformer means electrically connected between said alternating current source and said rectifying means.

3. The circuit of claim 1, and further comprising a rectifier element electrically connected between said direct current source and the relay to prevent direct current flow to the latter when the device is energized from the alternating current source.

4. The circuit of claim 2, and further comprising a rectifier element electrically connected between said direct current source and the relay to prevent direct current flow to the latter when the device is energized from the alternating current source.

5. The circuit of claim 2, in which said alternating current source is a relatively high voltage alternating current line, said direct current source being a battery of relatively low voltage rating.

6. The circuit of claim 3, in which said alternating current source is a relatively high voltage alternating current line, said direct current source being a battery of relatively low voltage rating.

7. The circuit of claim 4, in which said alternating current source is a relatively high voltage alternating current line, said direct current source being a battery of relatively low voltage rating.

8. An electrical circuit comprising a direct current motor, separate sources of alternating current and direct current voltage of substantially different voltage rating, one of said sources being a battery and the other source being a relatively high voltage alternating current line into which the subject circuit may be plugged, control switches wired in series with the battery, a relay connected in series with said switches and energized by direct current flow through the coil of the relay to complete a direct current holding subcircuit for said motor, as well as a motor energizing subcircuit through the armature of the relay to the motor, a stepdown voltage transformer having its primary electrically supplied by said alternating current source, rectifying means electrically connected to the secondary of said transformer and to said motor to complete a stepped-down and rectified electrical motor energizing circuit as an alternative to the battery-supplied circuitry to the motor.

9. The circuit of claim 8, and further comprising a rectifier element electrically connected between said battery and the relay to prevent a flow of direct current to said motor in opposition to the stepped down and rectified current.

10. The circuit of claim 8, in which said rectifying means comprises diodes connected to opposite terminals of the transformer secondary, a center tap of said secondary being electrically connected to a terminal of the relay and another terminal of the relay being connected to the motor.

11. The circuit of claim 9, in which said rectifying means comprises diodes connected to opposite terminals of the transformer secondary, a center tap of said secondary being electrically connected to a terminal of the relay and another terminal of the relay being connected to the motor.

12. The circuit of claim 1, and further comprising at least one control switch connected in series with said relay in said holding circuit.

13. The circuit of claim 2, and further comprising at least one control switch connected in series with said relay in said holding circuit.

14. The circuit of claim 3, and further comprising at least one control switch connected in series with said relay in said holding circuit.

15. The circuit of claim 12, in said control switch is a thermostatic one, and further comprising one manually operated switch connected in series with said relay and said control switch in said holding circuit.

16. The circuit of claim 13, in said control switch is a thermostatic one, and further comprising at least one manually operated switch connected in series with said relay and said control switch in said holding circuit.

17. The circuit of claim 14, in said control switch is a thermostatic one, and further comprising at least one manually operated switch connected in series with said relay and said control switch in said holding circuit.